(12) United States Patent
Craven et al.

(10) Patent No.: US 11,000,992 B2
(45) Date of Patent: May 11, 2021

(54) METHODS AND APPARATUS FOR CONTINUOUS LIQUID INTERFACE PRINTING WITH ELECTROCHEMICALLY SUPPORTED DEAD ZONE

(71) Applicants: Carbon, Inc., Redwood City, CA (US); The University of North Carolina at Chapel Hill, Chapel Hill, NC (US)

(72) Inventors: Ian Craven, San Carlos, CA (US); Joseph M. DeSimone, Monte Sereno, CA (US); Rima Janusziewicz, Carrboro, NC (US)

(73) Assignee: Carbon, Inc., Redwood City, CA (US)

( * ) Notice: Subject to any disclaimer, the term of this patent is extended or adjusted under 35 U.S.C. 154(b) by 658 days.

(21) Appl. No.: 15/547,326

(22) PCT Filed: Feb. 10, 2016

(86) PCT No.: PCT/US2016/017337
§ 371 (c)(1),
(2) Date: Jul. 28, 2017

(87) PCT Pub. No.: WO2016/133759
PCT Pub. Date: Aug. 25, 2016

(65) Prior Publication Data
US 2018/0009163 A1 Jan. 11, 2018

Related U.S. Application Data

(60) Provisional application No. 62/118,753, filed on Feb. 20, 2015.

(51) Int. Cl.
*B29C 64/135* (2017.01)
*B29C 64/129* (2017.01)
(Continued)

(52) U.S. Cl.
CPC .......... *B29C 64/135* (2017.08); *B29C 64/129* (2017.08); *B29C 64/227* (2017.08); *B29C 64/245* (2017.08); *B29C 64/255* (2017.08)

(58) Field of Classification Search
CPC ..... B29C 64/135; B29C 64/20; B29C 64/129; B29C 64/227; B29C 64/245; B29C 64/255
See application file for complete search history.

(56) References Cited

U.S. PATENT DOCUMENTS

| | | | |
|---|---|---|---|
| 5,980,812 A * | 11/1999 | Lawton | B22F 1/0003 264/401 |
| 2013/0292862 A1 | 11/2013 | Joyce et al. | |
| 2016/0229123 A1 * | 8/2016 | Carlson | B29C 64/386 |

FOREIGN PATENT DOCUMENTS

| | | |
|---|---|---|
| WO | WO 95/25003 A1 | 9/1995 |
| WO | WO 2014/126830 A2 | 8/2014 |
| WO | WO 2014/126834 A2 | 8/2014 |

OTHER PUBLICATIONS

International Search Report and Written Opinion, PCT/US2016/017337, dated Apr. 25, 2016.

* cited by examiner

*Primary Examiner* — Michael M. Robinson
(74) *Attorney, Agent, or Firm* — Myers Bigel, P.A.

(57) ABSTRACT

A method of forming a three-dimensional object is carried out by: providing a carrier and an optically transparent member having a build surface, the carrier and the build surface defining a build region therebetween; filling the build region with a polymerizable liquid; irradiating the build region through the optically transparent member to form a solid polymer from the polymerizable liquid while concurrently advancing the carrier away from the build surface to form the three-dimensional object from the solid (Continued)

polymer, while also concurrently: (i) continuously maintaining a dead zone of polymerizable liquid in contact with the build surface by electrochemically generating a polymerization inhibitor therein from a precursor of the polymerization inhibitor, and (ii) continuously maintaining a gradient of polymerization zone (e.g., an active surface) between the dead zone and the solid polymer and in contact with each thereof, the gradient of polymerization zone comprising the polymerizable liquid in partially cured form. Apparatus for carrying out the method is also described.

17 Claims, 4 Drawing Sheets

(51) Int. Cl.
    *B29C 64/245*     (2017.01)
    *B29C 64/255*     (2017.01)
    *B29C 64/227*     (2017.01)

METHODS AND APPARATUS FOR CONTINUOUS LIQUID INTERFACE PRINTING WITH ELECTROCHEMICALLY SUPPORTED DEAD ZONE

RELATED APPLICATIONS

This application is a 35 U.S.C. § 371 national phase entry of PCT Application PCT/US2016/017337, filed Feb. 10, 2016, and published in English on Aug. 25, 2016, as International Publication No. WO 2016/133759, and which claims the benefit of U.S. provisional application No. 62/118,753, filed Feb. 20, 2015, the disclosure of each of which is incorporated by reference herein in its entirety.

FIELD OF THE INVENTION

The present invention concerns methods and apparatus for the fabrication of solid three-dimensional objects from liquid materials.

BACKGROUND OF THE INVENTION

In conventional additive or three-dimensional fabrication techniques, construction of a three-dimensional object is performed in a step-wise or layer-by-layer manner. In particular, layer formation is performed through solidification of photo curable resin under the action of visible or UV light irradiation. Two techniques are known: one in which new layers are formed at the top surface of the growing object; the other in which new layers are formed at the bottom surface of the growing object.

If new layers are formed at the top surface of the growing object, then after each irradiation step the object under construction is lowered into the resin "pool," a new layer of resin is coated on top, and a new irradiation step takes place. An early example of such a technique is given in Hull, U.S. Pat. No. 5,236,637, at FIG. 3. A disadvantage of such "top down" techniques is the need to submerge the growing object in a (potentially deep) pool of liquid resin and reconstitute a precise overlayer of liquid resin.

If new layers are formed at the bottom of the growing object, then after each irradiation step the object under construction must be separated from the bottom plate in the fabrication well. An early example of such a technique is given in Hull, U.S. Pat. No. 5,236,637, at FIG. 4. While such "bottom up" techniques hold the potential to eliminate the need for a deep well in which the object is submerged by instead lifting the object out of a relatively shallow well or pool, a problem with such "bottom up" fabrication techniques, as commercially implemented, is that extreme care must be taken, and additional mechanical elements employed, when separating the solidified layer from the bottom plate due to physical and chemical interactions therebetween. For example, in U.S. Pat. No. 7,438,846, an elastic separation layer is used to achieve "non-destructive" separation of solidified material at the bottom construction plane. Other approaches, such as the B9Creator™ 3-dimensional printer marketed by B9Creations of Deadwood, S. Dak., USA, employ a sliding build plate. See, e.g., M. Joyce, US Patent App. 2013/0292862 and Y. Chen et al., US Patent App. 2013/0295212 (both Nov. 7, 2013); see also Y. Pan et al., *J. Manufacturing Sci. and Eng.* 134, 051011-1 (October 2012). Such approaches introduce a mechanical step that may complicate the apparatus, slow the method, and/or potentially distort the end product.

Continuous processes for producing a three-dimensional object are suggested at some length with respect to "top down" techniques in U.S. Pat. No. 7,892,474, but this reference does not explain how they may be implemented in "bottom up" systems in a manner non-destructive to the article being produced. Accordingly, there is a need for alternate methods and apparatus for three-dimensional fabrication that can obviate the need for mechanical separation steps in "bottom-up" fabrication.

SUMMARY OF THE INVENTION

Described herein are methods, systems and apparatus (including associated control methods, systems and apparatus), for the production of a three-dimensional object by additive manufacturing. In preferred (but not necessarily limiting) embodiments, the method is carried out continuously. In preferred (but not necessarily limiting) embodiments, the three-dimensional object is produced from a liquid interface. Hence they are sometimes referred to, for convenience and not for purposes of limitation, as "continuous liquid interphase printing" or "continuous liquid interface printing" ("CLIP") herein (the two being used interchangeably).

In some preferred embodiments of CLIP, the filling, irradiating, and/or advancing steps are carried out while also concurrently: (i) continuously maintaining a dead zone of polymerizable liquid in contact with said build surface, and (ii) continuously maintaining a gradient of polymerization zone (which may also be described as an active surface on the bottom of the growing three dimensional object, to which additional monomers may continue to polymerize) between said dead zone and said solid polymer and in contact with each thereof, said gradient of polymerization zone comprising said polymerizable liquid in partially cured form. Stated differently, in some preferred embodiments of CLIP, the three dimensional object, or at least some contiguous portion thereof, is formed or produced in situ. "In situ" as used herein has its meaning in the field of chemical engineering, and means "in place." For example, where both the growing portion of the three-dimensional object and the build surface (typically with their intervening active surface or gradient of polymerization, and dead zone) are maintained in place during formation of at least a portion of the 3D object, or sufficiently in place to avoid the formation of fault lines or planes in the 3D object. For example, in some embodiments according to the invention, different portions of the 3D object, which are contiguous with one another in the final 3D object, can both be formed sequentially from or within a gradient of polymerization or active surface. Furthermore, a first portion of the 3D object can remain in the gradient of polymerization or contacting the active surface while a second portion, that is contiguous with the first portion, is formed in the gradient of polymerization. Accordingly, the 3D object can be remotely fabricated, grown or produced continuously from the gradient of polymerization or active surface (rather than fabricated in discrete layers). The dead zone and gradient of polymerization zone/active surface may be maintained through some or all of the formation of the object being made, for example (and in some embodiments) for a time of at least 5, 10, 20, or 30 seconds, and in some embodiments for a time of at least 1 or 2 minutes.

Thus the present invention includes a a method of forming a three-dimensional object, comprising:

providing a carrier and an optically transparent member having a build surface, the carrier and the build surface defining a build region therebetween;

filling the build region with a polymerizable liquid, irradiating the build region through the optically transparent member to form a solid polymer from the polymerizable liquid while concurrently advancing the carrier away from the build surface to form the three-dimensional object from the solid polymer, while also concurrently: (i) continuously maintaining a dead zone of polymerizable liquid in contact with the build surface by electrochemically generating a polymerization inhibitor therein from a precursor of the polymerization inhibitor, and (ii) continuously maintaining a gradient of polymerization zone (e.g., an active surface) between the dead zone and the solid polymer and in contact with each thereof, the gradient of polymerization zone comprising the polymerizable liquid in partially cured form.

In some embodiments of the foregoing, the method further comprises providing an electrode assembly (e.g., an electrolytic or electrocatalytic electrode assembly) operatively associated with the optically transparent member (e.g., in a configuration to establish and maintain the dead zone), and the electrochemically generating step is carried out with the electrode assembly.

A further aspect of the invention is an apparatus for forming a three-dimensional object from a polymerizable liquid, comprising:

(a) a support;

(b) a carrier operatively associated with the support on which carrier the three-dimensional object is formed;

(c) an optically transparent member having a build surface, with the build surface and the carrier defining a build region therebetween;

(d) a liquid polymer supply operatively associated with the build surface and configured to supply liquid polymer into the build region for solidification or polymerization;

(e) a radiation source configured to irradiate the build region through the optically transparent member to form a solid polymer from the polymerizable liquid;

(f) a controller operatively associated with the carrier and the radiation source for advancing the carrier away from the build surface to form the three-dimensional object from the solid polymer, while also concurrently: (i) continuously maintaining a dead zone of polymerizable liquid in contact with the build surface, and (ii) continuously maintaining a gradient of polymerization zone (e.g., an active surface) between the dead zone and the solid polymer and in contact with each thereof, the gradient of polymerization zone comprising the polymerizable liquid in partially cured form; and (g) an electrode assembly operatively associated with the optically transparent member and configured to electrochemically generate a polymerization inhibitor from a precursor of the polymerization inhibitor in the build region in an amount sufficient to maintain the dead zone.

In some embodiments of the foregoing, the electrode assembly comprises a first electrode in or on the optically transparent member, and a counter-electrode either (i) in or on the optically transparent member, or (ii) operatively associated with polymerizable liquid (e.g., at a location separate from the build region). In other embodiments, the electrode assembly comprises a single electrode.

Additional aspects, non-limiting examples and specific embodiments of the present invention are explained in greater detail in the drawings herein and the specification set forth below. The disclosure of all United States Patent references cited herein are to be incorporated herein by reference in their entirety.

DETAILED DESCRIPTION OF ILLUSTRATIVE EMBODIMENTS

Figure 1:
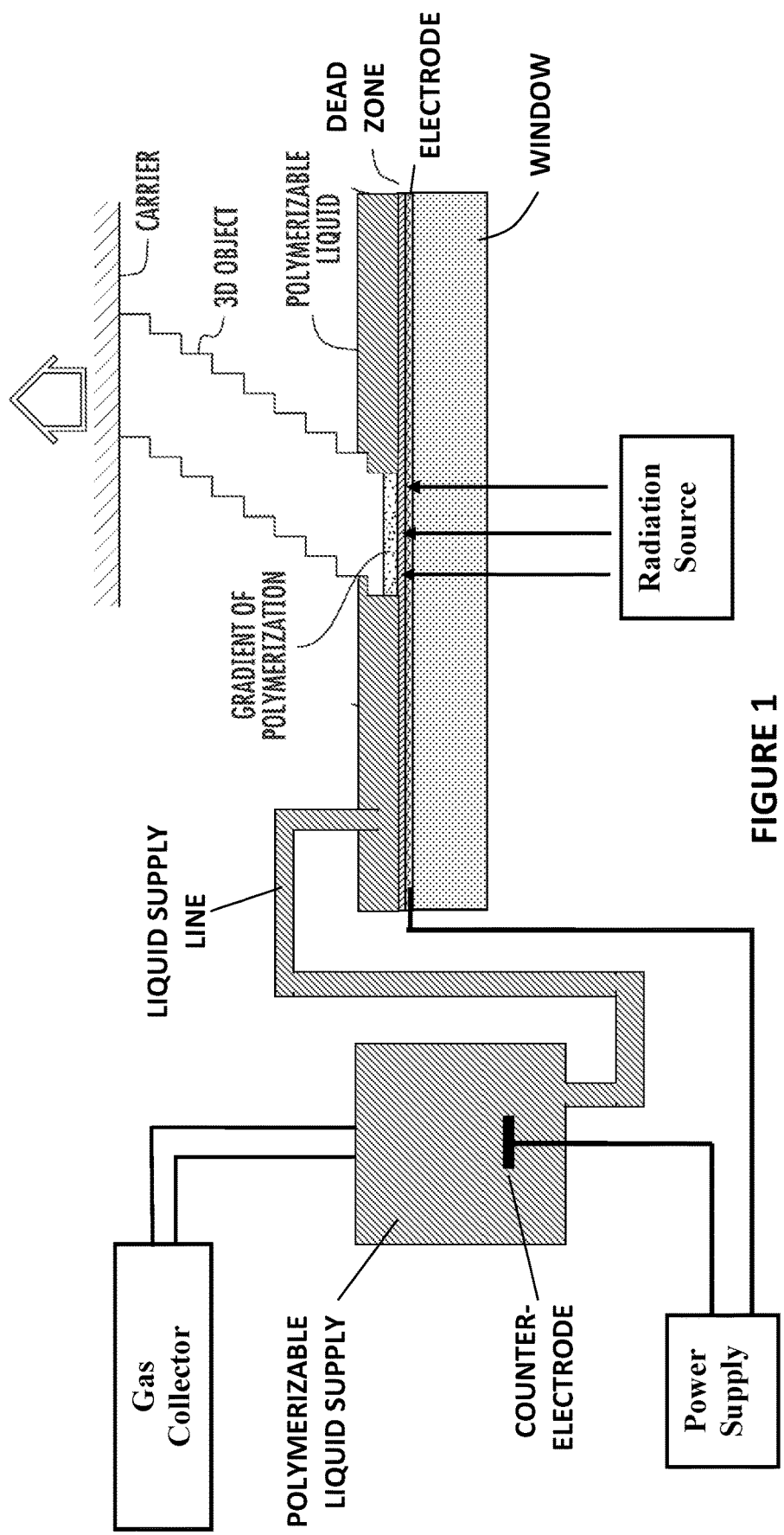
FIG. 1 is a schematic illustration of a first embodiment of the invention, where the electrode assembly comprises a pair of electrodes that separated from one another and in distinct locations.

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

Like numbers refer to like elements throughout. In the figures, the thickness of certain lines, layers, components, elements or features may be exaggerated for clarity. Where used, broken lines illustrate optional features or operations unless specified otherwise.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements components and/or groups or combinations thereof, but do not preclude the presence or addition of one or more other features, integers, steps, operations, elements, components and/or groups or combinations thereof.

As used herein, the term "and/or" includes any and all possible combinations or one or more of the associated listed items, as well as the lack of combinations when interpreted in the alternative ("or").

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and claims and should not be interpreted in an idealized or overly formal sense unless expressly so defined herein. Well-known functions or constructions may not be described in detail for brevity and/or clarity.

It will be understood that when an element is referred to as being "on," "attached" to, "connected" to, "coupled" with, "contacting," etc., another element, it can be directly on, attached to, connected to, coupled with and/or contacting the other element or intervening elements can also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature can have portions that overlap or underlie the adjacent feature.

Spatially relative terms, such as "under," "below," "lower," "over," "upper" and the like, may be used herein for ease of description to describe an element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus the exemplary term "under" can encompass both an orientation of over and under. The device may otherwise be oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only, unless specifically indicated otherwise.

It will be understood that, although the terms first, second, etc., may be used herein to describe various elements, components, regions, layers and/or sections, these elements, components, regions, layers and/or sections should not be limited by these terms. Rather, these terms are only used to distinguish one element, component, region, layer and/or section, from another element, component, region, layer and/or section. Thus, a first element, component, region, layer or section discussed herein could be termed a second element, component, region, layer or section without departing from the teachings of the present invention. The sequence of operations (or steps) is not limited to the order presented in the claims or figures unless specifically indicated otherwise.

1. Polymerizable Liquids.

Any suitable polymerizable liquid can be used to enable the present invention. The liquid (sometimes also referred to as "liquid resin" "ink," or simply "resin" herein) can include a monomer, particularly photopolymerizable and/or free radical polymerizable monomers, and a suitable initiator such as a free radical initiator, and combinations thereof. Examples include, but are not limited to, acrylics, methacrylics, acrylamides, styrenics, olefins, halogenated olefins, cyclic alkenes, maleic anhydride, alkenes, alkynes, carbon monoxide, functionalized oligomers, multifunctional cute site monomers, functionalized PEGs, etc., including combinations thereof. Examples of liquid resins, monomers and initiators include but are not limited to those set forth in U.S. Pat. Nos. 8,232,043; 8,119,214; 7,935,476; 7,767,728; 7,649,029; WO 2012129968 A1; CN 102715751 A; JP 2012210408 A.

Acid Catalyzed Polymerizable Liquids.

While in some embodiments as noted above the polymerizable liquid comprises a free radical polymerizable liquid (in which case an inhibitor may be oxygen as described below), in other embodiments the polymerizable liquid comprises an acid catalyzed, or cationically polymerized, polymerizable liquid. In such embodiments the polymerizable liquid comprises monomers contain groups suitable for acid catalysis, such as epoxide groups, vinyl ether groups, etc. Thus suitable monomers include olefins such as methoxyethene, 4-methoxystyrene, styrene, 2-methylprop-1-ene, 1,3-butadiene, etc.; heterocycloic monomers (including lactones, lactams, and cyclic amines) such as oxirane, thietane, tetrahydrofuran, oxazoline, 1,3, dioxepane, oxetan-2-one, etc., and combinations thereof. A suitable (generally ionic or non-ionic) photoacid generator (PAG) is included in the acid catalyzed polymerizable liquid, examples of which include, but are not limited to onium salts, sulfonium and iodonium salts, etc., such as diphenyl iodide hexafluorophosphate, diphenyl iodide hexafluoroarsenate, diphenyl iodide hexafluoroantimonate, diphenyl p-methoxyphenyl triflate, diphenyl p-toluenyl triflate, diphenyl p-isobutylphenyl triflate, diphenyl p-tert-butylphenyl triflate, triphenylsulfonium hexafluororphosphate, triphenylsulfonium hexafluoroarsenate, triphenylsulfonium hexafluoroantimonate, triphenylsulfonium triflate, dibutylnaphthylsulfonium triflate, etc., including mixtures thereof. See, e.g., U.S. Pat. Nos. 7,824,839; 7,550,246; 7,534,844; 6,692,891; 5,374,500; and 5,017,461; see also Photoacid Generator Selection Guide for the electronics industry and energy curable coatings (BASF 2010).

Hydrogels.

In some embodiments suitable resins includes photocurable hydrogels like poly(ethylene glycols) (PEG) and gelatins. PEG hydrogels have been used to deliver a variety of biologicals, including Growth factors; however, a great challenge facing PEG hydrogels crosslinked by chain growth polymerizations is the potential for irreversible protein damage. Conditions to maximize release of the biologicals from photopolymerized PEG diacrylate hydrogels can be enhanced by inclusion of affinity binding peptide sequences in the monomer resin solutions, prior to photopolymerization allowing sustained delivery. Gelatin is a biopolymer frequently used in food, cosmetic, pharmaceutical and photographic industries. It is obtained by thermal denaturation or chemical and physical degradation of collagen. There are three kinds of gelatin, including those found in animals, fish and humans. Gelatin from the skin of cold water fish is considered safe to use in pharmaceutical applications. UV or visible light can be used to crosslink appropriately modified gelatin. Methods for crosslinking gelatin include cure derivatives from dyes such as Rose Bengal.

Photocurable Silicone Resins.

A suitable resin includes photocurable silicones. UV cure silicone rubber, such as Siliopren™ UV Cure Silicone Rubber can be used as can LOCTITE™ Cure Silicone adhesives sealants. Applications include optical instruments, medical and surgical equipment, exterior lighting and enclosures, electrical connectors/sensors, fiber optics and gaskets.

Biodegradable Resins.

Biodegradable resins are particularly important for implantable devices to deliver drugs or for temporary performance applications, like biodegradable screws and stents (U.S. Pat. Nos. 7,919,162; 6,932,930). Biodegradable copolymers of lactic acid and glycolic acid (PLGA) can be dissolved in PEG dimethacrylate to yield a transparent resin suitable for use. Polycaprolactone and PLGA oligomers can be functionalized with acrylic or methacrylic groups to allow them to be effective resins for use.

Photocurable Polyurethanes.

A particularly useful resin is photocurable polyurethanes. A photopolymerizable polyurethane composition comprising (1) a polyurethane based on an aliphatic diisocyanate, poly(hexamethylene isophthalate glycol) and, optionally, 1,4-butanediol; (2) a polyfunctional acrylic ester; (3) a photoinitiator; and (4) an anti-oxidant, can be formulated so that it provides a hard, abrasion-resistant, and stain-resistant material (U.S. Pat. No. 4,337,130). Photocurable thermoplastic polyurethane elastomers incorporate photoreactive diacetylene diols as chain extenders.

High Performance Resins.

In some embodiments, high performance resins are used. Such high performance resins may sometimes require the use of heating to melt and/or reduce the viscosity thereof, as noted above and discussed further below. Examples of such resins include, but are not limited to, resins for those materials sometimes referred to as liquid crystalline polymers of esters, ester-imide, and ester-amide oligomers, as described in U.S. Pat. Nos. 7,507,784; 6,939,940. Since such resins are sometimes employed as high-temperature thermoset resins, in the present invention they further comprise a suitable photoinitiator such as benzophenone, anthraquinone, and fluoroenone initiators (including derivatives thereof), to initiate cross-linking on irradiation, as discussed further below.

Additional Example Resins.

Particularly useful resins for dental applications include EnvisionTEC's Clear Guide, EnvisionTEC's E-Denstone Material. Particularly useful resins for hearing aid industries include EnvisionTEC's e-Shell 300 Series of resins. Particularly useful resins include EnvisionTEC's HTM140IV High Temperature Mold Material for use directly with vulcanized rubber in molding/casting applications. A particularly useful material for making tough and stiff parts includes EnvisionTEC's RC31 resin. A particularly useful resin for investment casting applications includes EnvisionTEC's Easy Cast EC500 resin.

Additional Resin Ingredients.

The liquid resin or polymerizable material can have solid particles suspended or dispersed therein. Any suitable solid particle can be used, depending upon the end product being fabricated. The particles can be metallic, organic/polymeric, inorganic, or composites or mixtures thereof. The particles can be nonconductive, semi-conductive, or conductive (including metallic and non-metallic or polymer conductors); and the particles can be magnetic, ferromagnetic, paramagnetic, or nonmagnetic. The particles can be of any suitable shape, including spherical, elliptical, cylindrical, etc. The particles can comprise an active agent or detectable compound as described below, though these may also be provided dissolved solubilized in the liquid resin as also discussed below. For example, magnetic or paramagnetic particles or nanoparticles can be employed. The resin or polymerizable material may contain a dispersing agent, such as an ionic surfactant, a non-ionic surfactant, a block copolymer, or the like.

The liquid resin can have additional ingredients solubilized therein, including pigments, dyes, active compounds or pharmaceutical compounds, detectable compounds (e.g., fluorescent, phosphorescent, radioactive), etc., again depending upon the particular purpose of the product being fabricated. Examples of such additional ingredients include, but are not limited to, proteins, peptides, nucleic acids (DNA, RNA) such as siRNA, sugars, small organic compounds (drugs and drug-like compounds), etc., including combinations thereof.

Inhibitors of Polymerization.

Inhibitors or polymerization inhibitors for use in the present invention may be in the form of a liquid or a gas. In some embodiments, gas inhibitors are preferred. The specific inhibitor will depend upon the monomer being polymerized and the polymerization reaction. For free radical polymerization monomers, the inhibitor can conveniently be oxygen, which can be provided in the form of a gas such as air, a gas enriched in oxygen (optionally but in some embodiments preferably containing additional inert gases to reduce combustibility thereof), or in some embodiments pure oxygen gas. In alternate embodiments, such as where the monomer is polymerized by photoacid generator initiator, the inhibitor can be a base such as ammonia, trace amines (e.g. methyl amine, ethyl amine, di and trialkyl amines such as dimethyl amine, diethyl amine, trimethyl amine, triethyl amine, etc.), or carbon dioxide, including mixtures or combinations thereof.

Polymerizable Liquids Carrying Live Cells.

In some embodiments, the polymerizable liquid may carry live cells as "particles" therein. Such polymerizable liquids are generally aqueous, and may be oxygenated, and may be considered as "emulsions" where the live cells are the discrete phase. Suitable live cells may be plant cells (e.g., monocot, dicot), animal cells (e.g., mammalian, avian, amphibian, reptile cells), microbial cells (e.g., prokaryote, eukaryote, protozoal, etc.), etc. The cells may be of differentiated cells from or corresponding to any type of tissue (e.g., blood, cartilage, bone, muscle, endocrine gland, exocrine gland, epithelial, endothelial, etc.), or may be undifferentiated cells such as stem cells or progenitor cells. In such embodiments the polymerizable liquid can be one that forms a hydrogel, including but not limited to those described in U.S. Pat. Nos. 7,651,683; 7,651,682; 7,556,490; 6,602,975; 5,836,313; etc.

2. Apparatus.

Features and aspects of the methods and apparatus described herein can be implemented in like manner as described in DeSimone et al., PCT Application Publication No. WO 2014/126837, published Aug. 21, 2014 (and see also PCT Application Pub. Nos. WO 2014/126830 and WO 2014/126834, and US Patent Application Publication No. US 2014/0361463) (the disclosures of all of which are incorporated by reference herein in their entirety). Examples of such features and aspects include, but are not limited to, carriers, carrier drives, radiation sources/light engines, supporting frames, controllers and the like, along with descriptions and examples of the three dimensional products made.

In general, a liquid resin reservoir, tubing, pumps liquid level sensors and/or valves can be included to replenish the pool of liquid resin in the build chamber (not shown for clarity) though in some embodiments a simple gravity feed or siphon tube may be employed. Drives/actuators for the carrier or linear stage, along with associated wiring, can be included in accordance with known techniques (again not shown for clarity). The drives/actuators, radiation source, and in some embodiments pumps and liquid level sensors can all be operatively associated with a suitable controller, again in accordance with known techniques.

In general, when configured for placement in the apparatus, the carrier defines a "build region" on the build surface, within the total area of the build surface. Because lateral "throw" (e.g., in the X and/or Y directions) is not required in the present invention to break adhesion between successive layers, as in the Joyce and Chen devices noted previously, the area of the build region within the build surface may be maximized (or conversely, the area of the build surface not devoted to the build region may be minimized). Hence in some embodiments, the total surface area of the build region can occupy at least fifty, sixty, seventy, eighty, or ninety percent of the total surface area of the build surface.

The various components can be mounted on a support or frame assembly (not shown). While the particular design of the support or frame assembly is not critical and can assume numerous configurations, it may generally comprise a base to which the radiation source is securely or rigidly attached, a vertical member which the linear stage is operatively associated, and a horizontal table to which a walls removably or securely attached (or on which the wall is placed), and with the build plate fixed, either permanently or removably, to form the build chamber as described above.

Windows/Build Surfaces.

The choice of material for the optically transparent member (i.e., the "window") is not critical, so long as it is sufficiently optically transparent at to the radiation at the relevant wavelengths to allow sufficient actinic radiation (e.g., light such as ultraviolet light) to pass therethrough and polymerize the polymerizable liquid and form the three dimensional object. The portions of the window material (and/or electrodes) that contact the polymerizable liquid are preferably substantially inert with respect to the constituents of the polymerizable liquid. In general, the window may be flexible or inflexible, porous or non-porous, and may be formed of an inorganic material (e.g., glass, silica), an organic polymer (e.g., perflouropolymer, silicone, polydimethylsioloxane, etc.), or a composite thereof (e.g., a permeable or semipermeable member separating two electrodes).

Electrode Assemblies and Precursors of Polymerization Inhibitors.

The choice of electrode assembly will depend in part on the particular precursor, and corresponding inhibitor of polymerization, employed in the particular reaction being implemented for polymerization. The electrode or electrodes may be formed of a conductive metal (e.g., platinum, palladium, gold, etc.), a conducting polymer, a conducting oxide (e.g. indium tin oxide (ITO), fluorine doped tin oxide (FTO), aluminum-doped zinc oxide (AZO), indium-doped cadmium oxide, etc.), glassy carbon, carbon nanotube (CNT) and graphene materials (e.g., CNT thin films), and combinations thereof. Suitable conducting polymers include, but are not limited to, polyacetylene, polyaniline, polypyrrole, and polythiophene polymers, including derivatives and copolymers thereof, with specific examples including poly(3,4-etylenedioxythiophene (i.e., PEDOT), and PEDOT doped with poly(styrene sulfonate) (i.e., PEDOT:PSS). The electrode(s) may be in any suitable arrangement, such as formed in a sheet or film (sometimes referred to as "transparent conducting films"), as distinct elements (e.g., the "fingers" of an interdigitated array). The electrode assembly may be an electrolytic electrode, such as for electrolysis of water to form hydrogen and oxygen, or an electrocatalytic electrode assembly, such as for the formation of ammonia from water and atmospheric nitrogen (see, e.g., Lan, R., Irvine, J. T. S., and Tao, S., *Synthesis of ammonia directly from air and water at ambient temperature and pressure*, Scientific Reports 3: 1145, 1-7 (29 Jan. 2013)). When positioned in or on the window, the electrode(s) may be formed of a material that is transparent (as described in connection with windows above), or, if formed of a material that is not transparent, formed in sufficiently fine or narrow elements, with intervening gaps or spaces (e.g., in the form of a mesh or screen), so that radiation or light transmission through the electrode array is not unduly disrupted. The electrode or electrode assembly may be formed on the window or optically transparent member by any suitable means, including but not limited to chemical vapor deposition, beam deposition, spray pyrolysis, ultrasonic nozzle spraying, pulsed laser deposition, sputtering, spray deposition, as a self-assembled monolayer, etc., including combinations thereof.

EXAMPLE EMBODIMENTS

Figure 2:
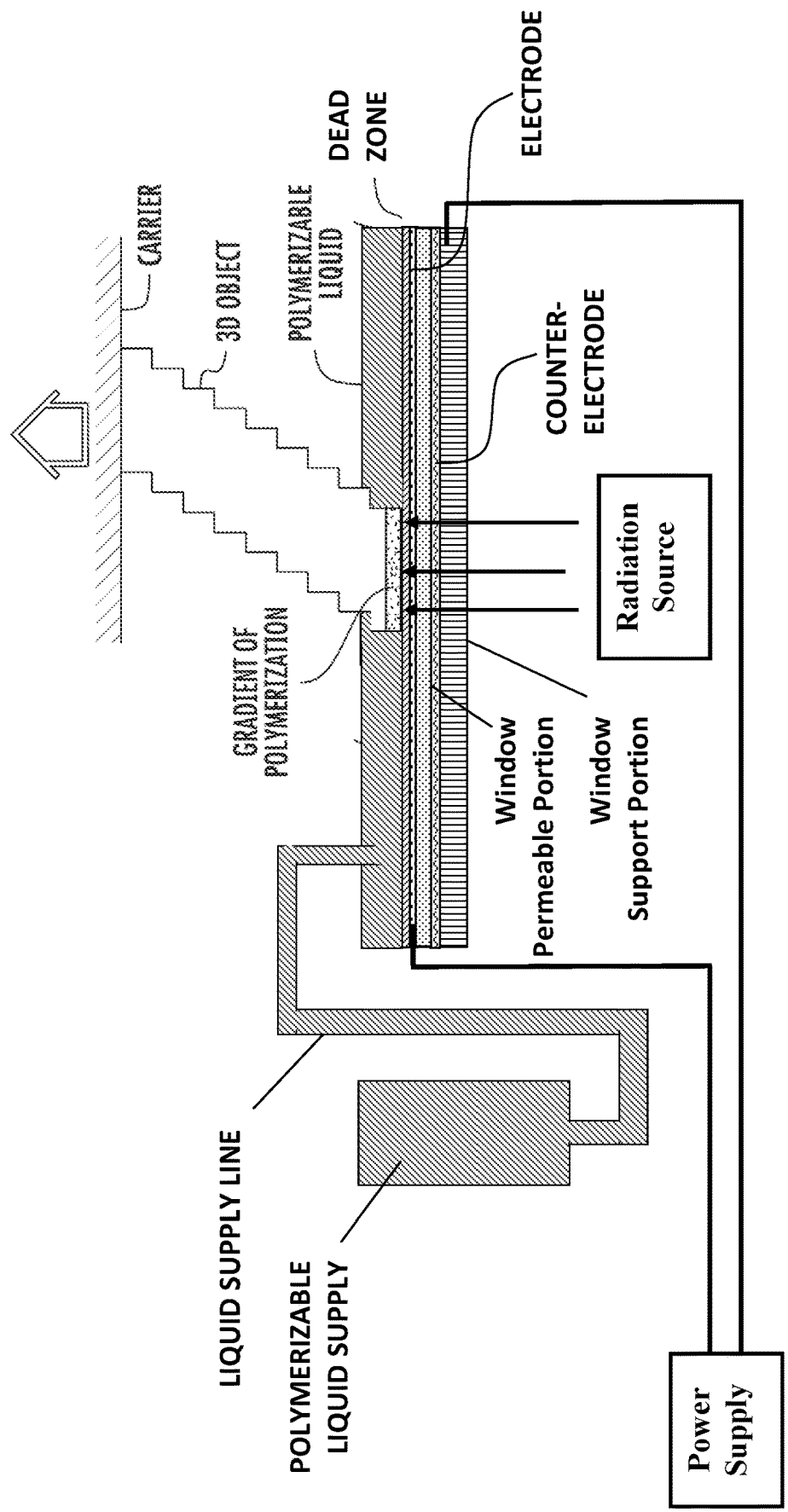
FIG. 2 is a schematic illustration of a second embodiment of the invention, where a pair of electrodes are adjacent one another, but separated by a permeable (or semipermeable) window (or window component).
Figure 3:
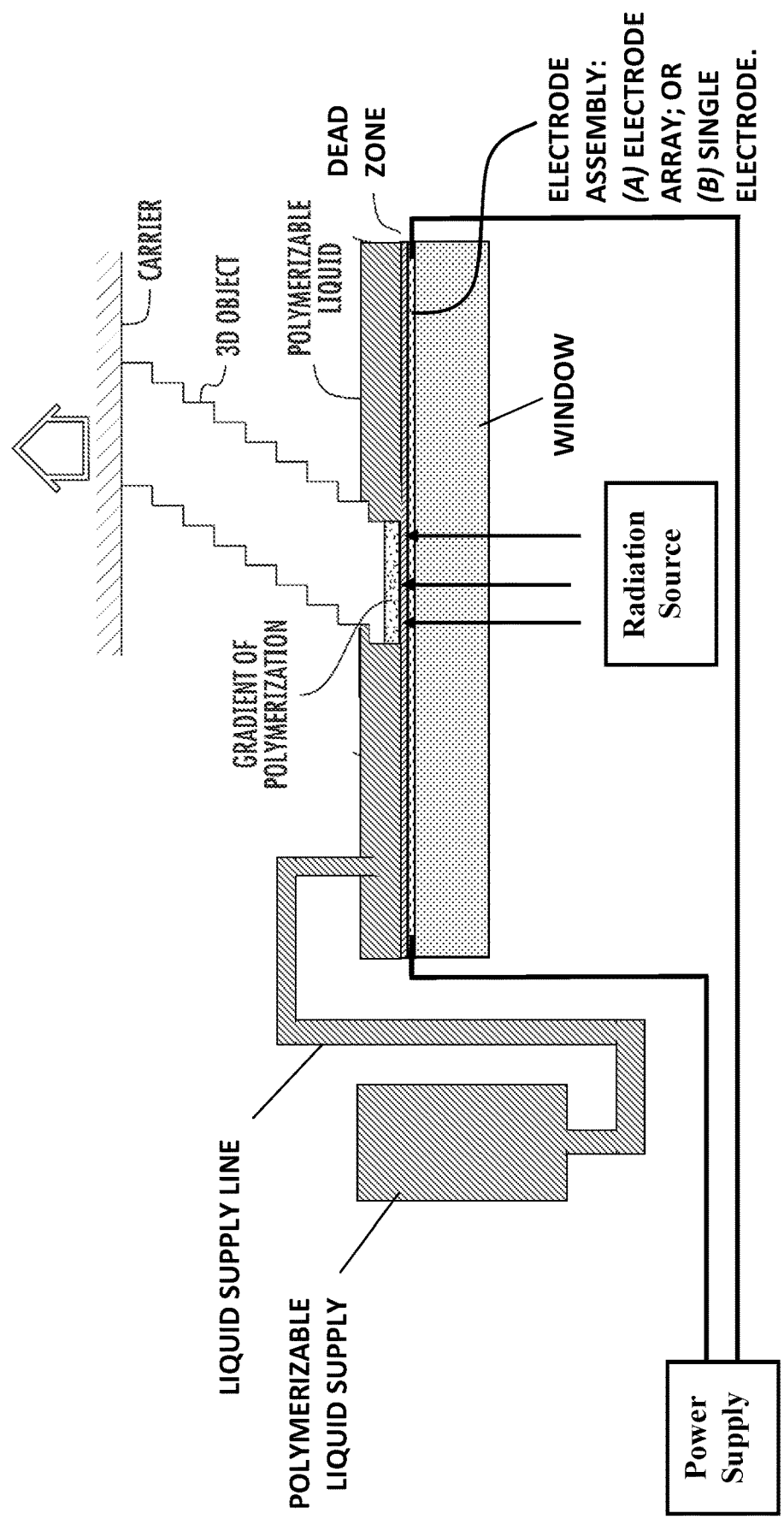
FIG. 3 is a schematic illustration of further embodiments of the invention, in which the electrode assembly comprises either a pair of electrodes in an array such as an interdigitated array, or a single electrode.

Non-limiting examples of the present invention are given in FIGS. 1-3.

As set forth in FIG. 1, an apparatus for carrying out a method of the invention may comprise a radiation source, an optically transparent member or "window", and a carrier. The window may be a composite of elements as noted above. A supply of polymerizable liquid may be included, from a separate reservoir to the top surface of the window through a supply line and/or pump as shown, or, simply as a reservoir on top of the window. A growing three dimensional object is shown positioned between the carrier and the window, with a dead zone of non-polymerized liquid on top of the window and a gradient of polymerization (or "active surface") between the dead zone and the growing three dimensional object.

In the embodiment of FIG. 1 an electrode (such as a single electrode array, optically transparent conductive polymer or conductive oxide film, etc.) is provided on the top surface of the window. A precursor of a polymerization inhibitor (e.g., water) is contained in the polymerizable liquid (dissolved or dispersed therein), and a counter-electrode is positioned in the separate polymerizable liquid supply, with electric continuity between the electrode and counter-electrode established through the liquid supply line. A power supply is operatively associated the electrode and counter-electrode, with the two configured to generate, by electrolysis, oxygen into the dead zone at the window, and hydrogen into the polymerizable liquid supply. A gas collector or vent system may be connected to the polymerizable liquid supply for collection and disposal/venting of the hydrogen.

FIG. 2 schematically illustrates an embodiment similar to that of FIG. 1, except that the counter-electrode has now been moved to the window, and a permeable portion, such as a porous polymer, screen, or mesh, or other separator, has been added between the electrode and the counter-electrode. If implemented to generate oxygen as an inhibitor, and hydrogen as a by-product, from water as a precursor, excess hydrogen which does not simply saturate into the polymerizable liquid can be disposed of by any suitable means, such as vented to the atmosphere, optionally as with the aid of a fan or blower, and/or mixed with a source of carbon dioxide, etc. An optional window support portion (e.g., a glass plate) can be included if desired, or an additional source of precursor (e.g., a water pool or reservoir) may be provided below the counter-electrode and in contact therewith, and through the permeable portion to the electrode.

FIG. 3 is similar to FIG. 2, but schematically illustrates several different embodiments: The first employs an electrode array, typically comprised of an anode and a cathode; the second comprises a single electrode through which a current is passed.

Figure 4A:
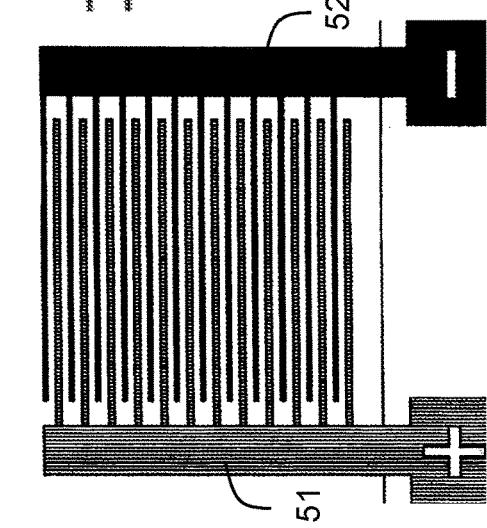
FIG. 4A schematically illustrates one embodiment of an interdigitated electrode array, or segment thereof.
Figure 4B:
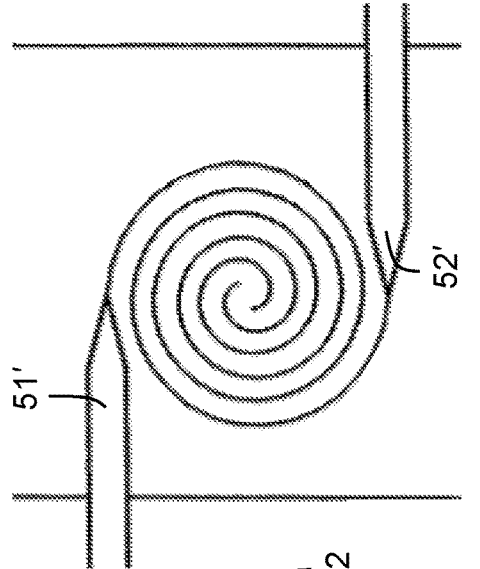
FIG. 4B schematically illustrates a second embodiment of an interdigitated electrode array, or segment thereof.
Figure 4C:
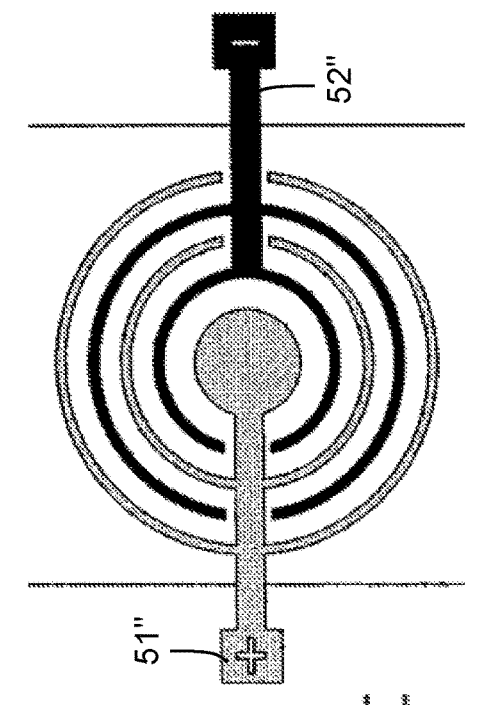
FIG. 4C schematically illustrates a third embodiment of an interdigitated electrode array, or segment thereof.

For the embodiment of FIG. 3 employing an electrode array (e.g., a pair of electrodes on the optically transparent member, such as an interdigitated array), that array may take any suitable form, including but not limited to those shown schematically, and as non-limiting examples, in FIGS. 4A-4C, with interdigitating electrodes 51 and 52, 51' and 52', and 51" and 52", respectively (adapted from U.S. Pat. No. 5,451,769; See also US Patent Application Publication No. US20110201098, the disclosures of which are incorporated by reference herein in their entirety). Repeating and/or expanded units thereof may also be employed. In addition, while horizontally oriented arrays are shown, it will be appreciated that vertically oriented arrays may also be employed. Depending on the specific choice of electrodes (discussed above), this embodiment of FIG. 3 may, for example, be used to generate oxygen from water (which water may be provided in the polymerizable liquid, and/or in a separate source beneath and contacting the permeable window portion), and/or used to generate ammonia from water and nitrogen (which water may be provided in the polymerizable liquid, and/or in a separate source beneath or contacting the permeable window portion, and which nitrogen may be atmospheric nitrogen, or provided from a nitrogen gas supply, either beneath and contacting the semipermeable window portion, or contacting the polymerizable liquid above the window itself).

Figure 5:
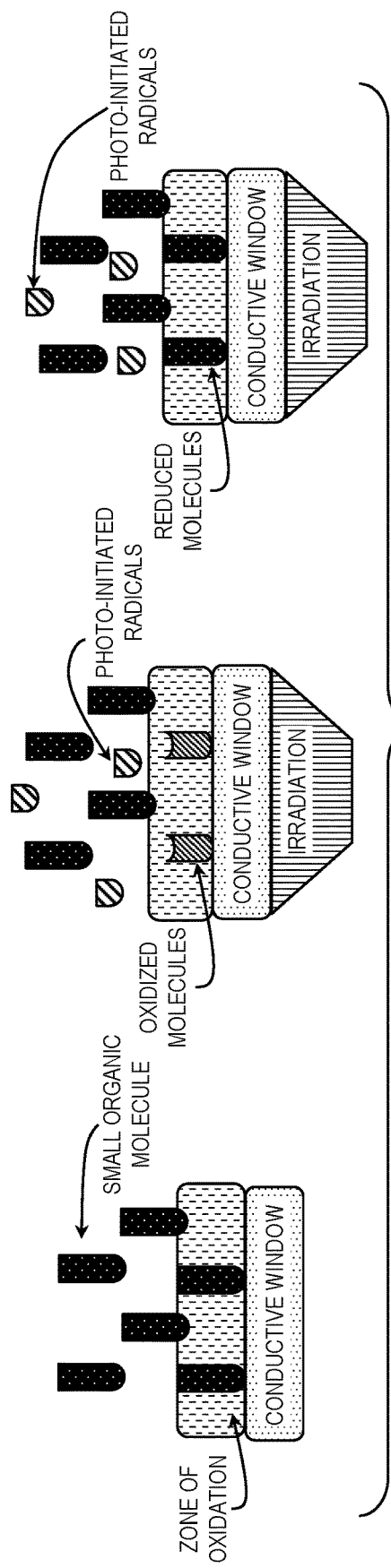
FIG. 5 schematically illustrates a reaction mechanism employing a single electrode.

In an alternate embodiment also schematically illustrated by FIG. 3, a single electrode rather than a pair of electrodes is used. In this embodiment (the reaction mechanism of which is schematically illustrated in FIG. 5), a small, oxidizable organic molecule that is oxidizable to a +1 oxidation state is included in the polymerizable liquid (similar to the treatment of dissolved atmospheric oxygen) and placed in contact with a conductive electrode such as a polymer electrode on the window, which serves as the working electrode. A current is passed through the electrode while the resin is simultaneously irradiated. The oxidizable organic molecule oxidizes to its +1 oxidation state upon interaction with the electrode, and the photo-initiator dissociates to generate a radical that can polymerize the monomer in the resin. The oxidized organic molecule interacts with the photo-initiator generated radicals which in turn reduces the oxidized organic molecule to its original ("oxidizable") state, while neutralizing the photo-initiator generated radicals. This will result in an inhibition of polymerization (see, e.g., Zoski, C. G. *Handbook of Electrochemistry* (1$^{st}$ ed.; ed.; Elsevier: Amsterdam, 2007); Schmidt am Busch, M.; Knapp, E. W. *J. Am. Chem. Soc.* 127, 15730-15737 (2005); Evans, D. H. *Chem. Rev.* 108, 2113-2144 (2008); Wardman, P. *J. Phys. Chem. Ref. Data.* 18, 1637-1755 (1989)), with the oxidized organic molecule serving as the polymerization inhibitor, and the corresponding reduced form thereof serving as the precursor of the polymerization inhibitor. The lack of diffusion of the oxidizable/oxidized molecule through the viscous polymerizable liquid results in only a small or thin localized region above the window being inhibited of polymerization, thus providing a dead zone (see, e.g., Skrzypczak, A; Neta. P. *J. Phys. Chem. A.*, 2003, 107, 7800-7803 (2003)). The oxidizable organic molecule in this region is regenerated upon reduction by a nearby radical to repeat this process upon further irradiation. This embodiment relies on the photo-initiated radicals to reduce and regenerate the oxidizable/oxidized organic compound to its original state, rather than a counter electrode. This embodiment may circumvent the issue of the reverse redox reaction and thereby not require an additional electrode to serve this function. In some embodiments it may be beneficial to have an auxiliary electrode to monitor potential however if all of the potential is dropped across the window this again would not be necessary.

For the embodiment of FIG. 5, oxidizable precursor molecules preferably meet specific criteria to fulfill the function of electrochemically generating a dead zone upon interaction with a single electrode. The criteria may include a +1 oxidation state, oxidation upon interaction with a potential, reduction by radical addition, and/or reversibility of electrochemistry in the presence of an organic or aprotic solvent. A favorable electrochemical pathway can have a formal potential equation resembling $A^+ \cdot + e \approx A$. Compounds that meet these criteria include, but are not limited to, conjugated aromatics, amines, and phenols, with specific examples including naphthalene and tri-p-tolylamine. In addition, if an auxiliary electrode is employed, then the criteria of a +1 oxidation state is no longer a constraint as the system can then be tuned to a specific potential thus expanding the list of available precursors to include compounds such as polyphenolic compounds and flavenoids (e.g., 1,2-dihydroxybenzene (also known as catechol)). Polyphenolic compounds such as flavonoids are known antioxidants and studied for their biological function in the oxidative stress pathway for their capacity to scavenge free radicals, and can be used to carry out the present invention. See, e.g., Rice-Evans, C. A.; Miller, N. J.; Paganga, G. *Free Radical Bio Med.* 20, 933-956 (1996); Chen, C. Y.; Lapsely, K.; Blumber, J. *J. Sci. Food Agric.* 86, 2445-2250 (2006).

Radiation Source.

Any suitable radiation source (or combination of sources) can be used, depending upon the particular resin employed, including electron beam and ionizing radiation sources. In a preferred embodiment the radiation source is an actinic radiation source, such as one or more light sources, and in particular one or more ultraviolet light sources. Any suitable light source can be used, such as incandescent lights, fluorescent lights, phosphorescent or luminescent lights, a laser, light-emitting diode, etc., including arrays thereof. The light source preferably includes a pattern-forming element operatively associated with a controller, as noted above. In some embodiments, the light source or pattern forming element comprises a digital (or deformable) micromirror device (DMD) with digital light processing (DLP), a spatial modulator (SLM), or a microelectromechanical system (MEMS) mirror array, a mask (aka a reticle), a silhouette, or a combination thereof. See, U.S. Pat. No. 7,902,526. Preferably the light source comprises a spatial light modulation array such as a liquid crystal light valve array or micromirror array or DMD (e.g., with an operatively associated digital light processor, typically in turn under the control of a suitable controller), configured to carry out exposure or irradiation of the polymerizable liquid without a mask, e.g., by maskless photolithography. See, e.g., U.S. Pat. Nos. 6,312,134; 6,248,509; 6,238,852; and 5,691,541.

Flat Panel Window and Radiation Source Combinations.

In the illustrated embodiments, the radiation source is illustrated as physically separated from the window. However, in some other embodiments, the radiation source may directly abut or contact the window, such as an array of light emitting diodes (e.g., ultraviolet or visible light emitting diodes), with the LED array and the window together forming a flat panel.

In some embodiments, as discussed further below, there may be movement in the X and/or Y directions concurrently with movement in the Z direction, with the movement in the X and/or Y direction hence occurring during polymerization of the polymerizable liquid (this is in contrast to the movement described in Y. Chen et al., or M. Joyce, supra, which is movement between prior and subsequent polymerization steps for the purpose of replenishing polymerizable liquid).

In the present invention such movement may be carried out for purposes such as reducing "burn in" or fouling in a particular zone of the build surface.

Because an advantage of some embodiments of the present invention is that the size of the build surface on the semipermeable member (i.e., the build plate or window) may be reduced due to the absence of a requirement for extensive lateral "throw" as in the Joyce or Chen devices noted above, in the methods, systems and apparatus of the present invention lateral movement (including movement in the X and/or Y direction or combination thereof) of the carrier and object (if such lateral movement is present) is preferably not more than, or less than, 80, 70, 60, 50, 40, 30, 20, or even 10 percent of the width (in the direction of that lateral movement) of the build region.

While in some embodiments the carrier is mounted on an elevator to advance up and away from a stationary build plate, on other embodiments the converse arrangement may be used: That is, the carrier may be fixed and the build plate lowered to thereby advance the carrier away therefrom. Numerous different mechanical configurations will be apparent to those skilled in the art to achieve the same result.

Depending on the choice of material from which the carrier is fabricated, and the choice of polymer or resin from which the article is made, adhesion of the article to the carrier may sometimes be insufficient to retain the article on the carrier through to completion of the finished article or "build." For example, an aluminum carrier may have lower adhesion than a poly(vinyl chloride) (or "PVC") carrier. Hence one solution is to employ a carrier comprising a PVC on the surface to which the article being fabricated is polymerized. If this promotes too great an adhesion to conveniently separate the finished part from the carrier, then any of a variety of techniques can be used to further secure the article to a less adhesive carrier, including but not limited to the application of adhesive tape such as "Greener Masking Tape for Basic Painting #2025 High adhesion" to further secure the article to the carrier during fabrication.

Controller and Process Control.

The methods and apparatus of the invention can include process steps and apparatus features to implement process control, including feedback and feed-forward control, to, for example, enhance the speed and/or reliability of the method.

A controller for use in carrying out the present invention may be implemented as hardware circuitry, software, or a combination thereof. In one embodiment, the controller is a general purpose computer that runs software, operatively associated with monitors, drives, pumps, and other components through suitable interface hardware and/or software. Suitable software for the control of a three-dimensional printing or fabrication method and apparatus as described herein includes, but is not limited to, the ReplicatorG open source 3d printing program, 3DPrint™ controller software from 3D systems, Slic3r, Skeinforge, KISSlicer, Repetier-Host, PrintRun, Cura, etc., including combinations thereof.

Process parameters to directly or indirectly monitor, continuously or intermittently, during the process (e.g., during one, some or all of said filling, irradiating and advancing steps) include, but are not limited to, irradiation intensity, temperature of carrier, polymerizable liquid in the build zone, temperature of growing product, temperature of build plate, pressure, speed of advance, pressure, force (e.g., exerted on the build plate through the carrier and product being fabricated), strain (e.g., exerted on the carrier by the growing product being fabricated), thickness of release layer, etc.

Known parameters that may be used in feedback and/or feed-forward control systems include, but are not limited to, expected consumption of polymerizable liquid (e.g., from the known geometry or volume of the article being fabricated), degradation temperature of the polymer being formed from the polymerizable liquid, etc.

Process conditions to directly or indirectly control, continuously or step-wise, in response to a monitored parameter, and/or known parameters (e.g., during any or all of the process steps noted above), include, but are not limited to, rate of supply of polymerizable liquid, temperature, pressure, rate or speed of advance of carrier, intensity of irradiation, duration of irradiation (e.g. for each "slice"), etc.

For example, the temperature of the polymerizable liquid in the build zone, or the temperature of the build plate, can be monitored, directly or indirectly with an appropriate thermocouple, non-contact temperature sensor (e.g., an infrared temperature sensor), or other suitable temperature sensor, to determine whether the temperature exceeds the degradation temperature of the polymerized product. If so, a process parameter may be adjusted through a controller to reduce the temperature in the build zone and/or of the build plate. Suitable process parameters for such adjustment may include: decreasing temperature with a cooler, decreasing the rate of advance of the carrier, decreasing intensity of the irradiation, decreasing duration of radiation exposure, etc.

In addition, the intensity of the irradiation source (e.g., an ultraviolet light source such as a mercury lamp) may be monitored with a photodetector to detect a decrease of intensity from the irradiation source (e.g., through routine degradation thereof during use). If detected, a process parameter may be adjusted through a controller to accommodate the loss of intensity. Suitable process parameters for such adjustment may include: increasing temperature with a heater, decreasing the rate of advance of the carrier, increasing power to the light source, etc.

As another example, control of temperature and/or pressure to enhance fabrication time may be achieved with heaters and coolers (individually, or in combination with one another and separately responsive to a controller), and/or with a pressure supply (e.g., pump, pressure vessel, valves and combinations thereof) and/or a pressure release mechanism such as a controllable valve (individually, or in combination with one another and separately responsive to a controller).

In some embodiments the controller is configured to maintain the gradient of polymerization zone or active surface described herein throughout the fabrication of some or all of the final product. The specific configuration (e.g., times, rate or speed of advancing, radiation intensity, temperature, etc.) will depend upon factors such as the nature of the specific polymerizable liquid and the product being created. Configuration to maintain the gradient of polymerization zone may be carried out empirically, by entering a set of process parameters or instructions previously determined, or determined through a series of test runs or "trial and error"; configuration may be provided through pre-determined instructions; configuration may be achieved by suitable monitoring and feedback (as discussed above), combinations thereof, or in any other suitable manner.

In some embodiments, a method and apparatus as described above may be controlled by a software program running in a general purpose computer with suitable interface hardware between that computer and the apparatus described above. Numerous alternatives are commercially available. For example, a Parallax Propeller Microcontroller, Sparkfun EasyDriver stepper motor driver, Luxeon Single LED Driver, Parallax USB to Serial converter, and Texas Instruments LightCrafter DLP systems may be used.

3. Methods.

As noted above, the present invention includes a method of forming a three-dimensional object, comprising:

providing a carrier and an optically transparent member having a build surface, the carrier and the build surface defining a build region therebetween;

filling the build region with a polymerizable liquid, irradiating the build region through the optically transparent member to form a solid polymer from the polymerizable liquid while concurrently advancing the carrier away from the build surface to form the three-dimensional object from the solid polymer, while also concurrently:

(i) continuously maintaining a dead zone of polymerizable liquid in contact with the build surface by electrochemically generating a polymerization inhibitor therein from a precursor of the polymerization inhibitor, and (ii) continuously maintaining a gradient of polymerization zone (e.g., an active surface) between the dead zone and the solid polymer and in contact with each thereof, the gradient of polymerization zone comprising the polymerizable liquid in partially cured form.

In some embodiments of the foregoing, the method further comprises providing an electrode assembly (e.g., an electrolytic or electrocatalytic electrode assembly) operatively associated with the optically transparent member (e.g., in a configuration to establish and maintain the dead zone), and the electrochemically generating step is carried out with the electrode assembly.

A further aspect of the invention is an apparatus for forming a three-dimensional object from a polymerizable liquid, comprising:

(a) a support;

(b) a carrier operatively associated with the support on which carrier the three-dimensional object is formed;

(c) an optically transparent member having a build surface, with the build surface and the carrier defining a build region therebetween;

(d) a liquid polymer supply operatively associated with the build surface and configured to supply liquid polymer into the build region for solidification or polymerization;

(e) a radiation source configured to irradiate the build region through the optically transparent member to form a solid polymer from the polymerizable liquid;

(f) a controller operatively associated with the carrier and the radiation source for advancing the carrier away from the build surface to form the three-dimensional object from the solid polymer, while also concurrently: (i) continuously maintaining a dead zone of polymerizable liquid in contact with the build surface, and (ii) continuously maintaining a gradient of polymerization zone (e.g., an active surface) between the dead zone and the solid polymer and in contact with each thereof, the gradient of polymerization zone comprising the polymerizable liquid in partially cured form; and (g) an electrode assembly operatively associated with the optically transparent member and configured to electrochemically generate a polymerization inhibitor from a precursor of the polymerization inhibitor in the build region in an amount sufficient to maintain the dead zone.

In some embodiments of the foregoing, the electrode assembly comprises a first electrode in or on the optically transparent member, and a counter-electrode either (i) in or on the optically transparent member, or (ii) operatively associated with polymerizable liquid (e.g., at a location separate from the build region). In other embodiments, the electrode assembly comprises a single electrode.

In some embodiments, (a) the precursor is water and the inhibitor is oxygen; (b) the precursor is water and atmospheric nitrogen, and the inhibitor is ammonia; or (c) the precursor is regenerable (e.g., the precursor is an oxidizable organic compound oxidizable to an oxidized species (e.g., conjugated aromatic, amine, phenol, and polyphenol compounds, etc.), and the inhibitor is the oxidized species thereof).

In some embodiments of the foregoing, the electrode assembly comprises an interdigitated electrode array and/or a conductive (organic or inorganic) transparent film.

In some embodiments, the precursor is in the polymerizable liquid.

In some embodiments, the irradiating step is carried out by maskless photolithography.

In some embodiments, the method further comprises the step of disrupting the gradient of polymerization zone for a time sufficient to form a cleavage line in the three-dimensional object.

In some embodiments, the method further comprises heating the polymerizable liquid to reduce the viscosity thereof in the build region.

In some embodiments, the carrier has at least one channel formed therein, and the filling step is carried out by passing or forcing the polymerizable liquid into the build region through the at least one channel (e.g., (i) directly through the growing three-dimensional object, such as in the case of a hollow object, (ii) through feed conduits fabricated concurrently but separately from the growing three-dimensional object, or (iii) a combination thereof).

In some embodiments, the irradiating step is carried out with actinic radiation.

In some embodiments, the the total surface area of the build region occupies at least seventy percent of the total surface area of the build surface; and/or lateral movement of the carrier and object in any direction is not more than thirty percent of the width of the build region in the corresponding direction.

In some embodiments, the advancing step is carried out sequentially in uniform increments (e.g., of from 0.1 or 1 microns, up to 10 or 100 microns, or more) for each step or increment. In some embodiments, the advancing step is carried out sequentially in variable increments (e.g., each increment ranging from 0.1 or 1 microns, up to 10 or 100 microns, or more) for each step or increment. The size of the increment, along with the rate of advancing, will depend in part upon factors such as temperature, pressure, structure of the article being produced (e.g., size, density, complexity, configuration, etc.)

In other embodiments of the invention, the advancing step is carried out continuously, at a uniform or variable rate.

In some embodiments, the cumulative rate of advance (whether carried out sequentially or continuously) is from about 0.1 1, or 10 microns per second, up to about to 100, 1,000, or 10,000 microns per second, again depending again depending on factors such as temperature, pressure, structure of the article being produced, intensity of radiation, etc.

As noted above, the irradiating step is in some embodiments carried out with patterned irradiation. The patterned irradiation may be a fixed pattern or may be a variable pattern created by a pattern generator (e.g., a DLP) as discussed above, depending upon the particular item being fabricated.

When the patterned irradiation is a variable pattern rather than a pattern that is held constant over time, then each irradiating step may be any suitable time or duration depending on factors such as the intensity of the irradiation, the presence or absence of dyes in the polymerizable material, the rate of growth, etc. Thus in some embodiments each irradiating step can be from 0.001, 0.01, 0.1, 1 or 10 microseconds, up to 1, 10, or 100 minutes, or more, in duration. The interval between each irradiating step is in some embodiments preferably as brief as possible, e.g., from 0.001, 0.01, 0.1, or 1 microseconds up to 0.1, 1, or 10 seconds.

While the dead zone and the gradient of polymerization zone do not have a strict boundary therebetween (in those locations where the two meet), the thickness of the gradient of polymerization zone is in some embodiments at least as great as the thickness of the dead zone. Thus, in some embodiments, the dead zone has a thickness of from 0.01, 0.1, 1, 2, or 10 microns up to 100, 200 or 400 microns, or more, and/or said gradient of polymerization zone and said dead zone together have a thickness of from 1 or 2 microns up to 400, 600, or 1000 microns, or more. Thus the gradient of polymerization zone may be thick or thin depending on the particular process conditions at that time. Where the gradient of polymerization zone is thin, it may also be described as an active surface on the bottom of the growing three-dimensional object, with which monomers can react and continue to form growing polymer chains therewith. In some embodiments, the gradient of polymerization zone, or active surface, is maintained (while polymerizing steps continue) for a time of at least 5, 10, 15, 20 or 30 seconds, up to 5, 10, 15 or 20 minutes or more, or until completion of the three-dimensional product.

The method may further comprise the step of disrupting said gradient of polymerization zone for a time sufficient to form a cleavage line in said three-dimensional object (e.g., at a predetermined desired location for intentional cleavage, or at a location in said object where prevention of cleavage or reduction of cleavage is non-critical), and then reinstating said gradient of polymerization zone (e.g. by pausing, and resuming, the advancing step, increasing, then decreasing, the intensity of irradiation, and combinations thereof.

In an embodiment of the present invention, the carrier is vertically reciprocated with respect to the build surface (that is, the two are vertically reciprocated with respect to one another) to enhance or speed the refilling of the build region with the polymerizable liquid.

In some embodiments, the vertically reciprocating step, which comprises an upstroke and a downstroke, is carried out with the distance of travel of the upstroke being greater than the distance of travel of the downstroke, to thereby concurrently carry out the advancing step (that is, driving the carrier away from the build plate in the Z dimension) in part or in whole.

In some embodiments, the speed of the upstroke gradually accelerates (that is, there is provided a gradual start and/or gradual acceleration of the upstroke, over a period of at least 20, 30, 40, or 50 percent of the total time of the upstroke, until the conclusion of the upstroke, or the change of direction which represents the beginning of the downstroke. Stated differently, the upstroke begins, or starts, gently or gradually.

In some embodiments, the speed of the downstroke gradually decelerates (that is, there is provided a gradual termination and/or gradual deceleration of the downstroke, over a period of at least 20, 30, 40, or 50 percent of the total time of the downstroke. Stated differently, the downstroke concludes, or ends, gently or gradually.

While in some embodiments there is an abrupt end, or abrupt deceleration, of the upstroke, and an abrupt beginning or deceleration of the downstroke (e.g., a rapid change in vector or direction of travel from upstroke to downstroke), it will be appreciated that gradual transitions may be introduced here as well (e.g., through introduction of a "plateau" or pause in travel between the upstroke and downstroke). It will also be appreciated that, while each reciprocating step may be consist of a single upstroke and downstroke, the reciprocation step may comprise a plurality of 2, 3, 4 or 5 or more linked set of reciprocations, which may e the same or different in frequent and/or amplitude In some embodiments, the vertically reciprocating step is carried out over a total time of from 0.01 or 0.1 seconds up to 1 or 10 seconds (e.g., per cycle of an upstroke and a downstroke).

In some embodiments, the upstroke distance of travel is from 0.02 or 0.2 millimeters (or 20 or 200 microns) to 1 or 10 millimeters (or 1000 to 10,000 microns). The distance of travel of the downstroke may be the same as, or less than, the distance of travel of the upstroke, where a lesser distance of travel for the downstroke serves to achieve the advancing of the carrier away from the build surface as the three-dimensional object is gradually formed. Where a reciprocation step comprises multiple linked reciprocations, the sum distance of travel of all upstrokes in that set is preferably greater than the sum distance of travel of all downstrokes in that set, to achieve the advancing of the carrier away from the build surface as the three-dimensional object is gradually formed.

Preferably the vertically reciprocating step, and particularly the upstroke thereof, does not cause the formation of gas bubbles or a gas pocket in the build region, but instead the build region remains filled with the polymerizable liquid throughout the reciprocation steps, and the gradient of polymerization zone or region remains in contact with the "dead zone" and with the growing object being fabricated throughout the reciprocation steps. As will be appreciated, a purpose of the reciprocation is to speed or enhance the refilling of the build region, particularly where larger build regions are to be refilled with polymerizable liquid, as compared to the speed at which the build region could be refilled without the reciprocation step.

In some embodiments, the advancing step is carried out intermittently at a rate of 1, 2, 5 or 10 individual advances per minute up to 300, 600, or 1000 individual advances per minute, each followed by a pause during which an irradiating step is carried out. It will be appreciated that one or more reciprocation steps (e.g., upstroke plus downstroke) may be carried out within each advancing step. Stated differently, the reciprocating steps may be nested within the advancing steps.

In some embodiments, the individual advances are carried out over an average distance of travel for each advance of from 10 or 50 microns to 100 or 200 microns (optionally including the total distance of travel for each vertically reciprocating step, e.g., the sum of the upstroke distance minus the downstroke distance).

Apparatus for carrying out the invention in which the reciprocation steps described herein are implemented substantially as described above, with the drive associated with the carrier, and/or with an additional drive operatively associated with the transparent member, and with the controller operatively associated with either or both thereof and configured to reciprocate the carrier and transparent member with respect to one another as described above.

In the alternative, vertical reciprocation may be carried out by configuring the build surface (and corresponding build plate or transparent member) so that it may have a limited range of movement up and down in the vertical or "Z" dimension, while the carrier advances (e.g., continuously or step-wise) away from the build plate in the vertical or "Z" dimension. In some embodiments, such limited range of movement may be passively imparted, such as with upward motion achieved by partial adhesion of the build plate to the growing object through a viscous polymerizable liquid, followed by downward motion achieved by the weight, resiliency, etc. of the build plate (optionally including springs, buffers, shock absorbers or the like, configured to influence either upward or downward motion of the build plate and build surface). In another embodiment, such motion of the build surface may be actively achieved, by operatively associating a separate drive system with the build plate, which drive system is also operatively associated with the controller, to separately achieve vertical reciprocation. In still another embodiment, vertical reciprocation may be carried out by configuring the build plate, and/or the build surface, so that it flexes upward and downward, with the upward motion thereof being achieved by partial adhesion of the build surface to the growing object through a viscous polymerizable liquid, followed by downward motion achieved by the inherent stiffness of the build surface biasing it or causing it to return to a prior position.

It will be appreciated that illumination or irradiation steps, when intermittent, may be carried out in a manner synchronized with vertical reciprocation, or not synchronized with vertical reciprocation, depending on factors such as whether the reciprocation is achieved actively or passively.

It will also be appreciated that vertical reciprocation may be carried out between the carrier and all regions of the build surface simultaneously (e.g., where the build surface is rigid), or may be carried out between the carrier and different regions of the build surface at different times (e.g., where the build surface is of a flexible material, such as a tensioned polymer film).

The foregoing is illustrative of the present invention, and is not to be construed as limiting thereof. The invention is defined by the following claims, with equivalents of the claims to be included therein.

We claim:

1. A method of forming a three-dimensional object, comprising:
   providing a carrier and an optically transparent member having a build surface, said carrier and said build surface defining a build region therebetween;
   filling said build region with a polymerizable liquid;
   irradiating said build region through said optically transparent member to form a solid polymer from said polymerizable liquid while concurrently advancing said carrier away from said build surface to form said three-dimensional object from said solid polymer, while also concurrently:
   (i) continuously maintaining a dead zone of polymerizable liquid in contact with said build surface by electrochemically generating a polymerization inhibitor therein from a precursor of said polymerization inhibitor, and
   (ii) continuously maintaining a gradient of polymerization zone between said dead zone and said solid polymer and in contact with each thereof, said gradient of polymerization zone comprising said polymerizable liquid in partially cured form;
   the method further comprising providing an electrode assembly operatively associated with said optically transparent member, wherein said electrochemically generating step is carried out with said electrode assembly,
   wherein said electrode assembly comprises a first electrode in or on said optically transparent member, and a counter-electrode either (i) in or on said optically transparent member, or (ii) operatively associated with polymerizable liquid,
   wherein:
   (a) said precursor is water and said inhibitor is oxygen;
   (b) said precursor is water and atmospheric nitrogen, and said inhibitor is ammonia; or
   (c) said precursor is regenerable such that said precursor is an oxidizable organic compound oxidizable to an oxidized species, and said inhibitor is said oxidized species thereof.

2. The method of claim 1, wherein said electrode assembly comprises an interdigitated electrode array and/or a conductive transparent film.

3. The method of claim 1, wherein said optically transparent member is flexible or inflexible, porous or non-porous, and comprised of an inorganic material, an organic polymer, or a composite thereof.

4. The method of claim 1, wherein said electrode assembly comprises an electrolytic or electrocatalytic electrode assembly.

5. The method of claim 1, wherein said precursor is in said polymerizable liquid.

6. The method of claim 1, wherein said irradiating step is carried out by maskless photolithography.

7. The method of claim 1, wherein said gradient of polymerization zone and said dead zone together have a thickness of from 1 to 1000 microns.

8. The method of claim 1, wherein said gradient of polymerization zone is maintained for a time of at least 5, 10, or 20 seconds, or at least 1 or 2 minutes.

9. The method of claim 1, further comprising the step of disrupting said gradient of polymerization zone for a time sufficient to form a cleavage line in said three-dimensional object.

10. The method of claim 1, further comprising the step of heating said polymerizable liquid to reduce the viscosity thereof in said build region.

11. The method of claim 1, wherein said carrier has at least one channel formed therein, and said filling step is carried out by passing or forcing said polymerizable liquid into said build region through said at least one channel.

12. The method of claim 1, wherein said irradiating step is carried out with actinic radiation.

13. The method of claim 1, wherein said concurrently advancing is carried out at a cumulative rate of at least 10 microns per second.

14. The method of claim 1, wherein:
   the total surface area of the build region occupies at least seventy percent of the total surface area of the build surface; and/or
   wherein lateral movement of the carrier and object in any direction is not more than thirty percent of the width of said build region in the corresponding direction.

15. The method of claim 1, wherein said optically transparent member is stationary.

16. The method of claim 1, wherein:
   said advancing comprises unidirectionally advancing said carrier away from said optically transparent member; and/or
   said advancing includes vertically reciprocating said carrier and said optically transparent member with respect to one another to speed or enhance the filling of said build region with said polymerizable liquid.

17. The method of claim 1, wherein (a) said polymerizable liquid comprises a free radical polymerizable liquid and said inhibitor comprises oxygen, or (b) said polymerizable liquid comprises an acid-catalyzed or cationically polymerizable liquid, and said inhibitor comprises a base.

* * * * *

UNITED STATES PATENT AND TRADEMARK OFFICE
CERTIFICATE OF CORRECTION

PATENT NO. : 11,000,992 B2  
APPLICATION NO. : 15/547326  
DATED : May 11, 2021  
INVENTOR(S) : Craven et al.

Page 1 of 1

It is certified that error appears in the above-identified patent and that said Letters Patent is hereby corrected as shown below:

In the Specification

Column 11, Lines 43-44: Please correct "$1^{st}$ ed.; ed.; Elsevier:" to read -- $1^{st}$ ed.; Elsevier: --

Column 12, Line 9: Please correct "$A^+ \cdot + e \approx A$" to read -- $A^+ \cdot + e \rightleftharpoons A$ --

Signed and Sealed this  
Fifteenth Day of March, 2022

Drew Hirshfeld  
*Performing the Functions and Duties of the*  
*Under Secretary of Commerce for Intellectual Property and*  
*Director of the United States Patent and Trademark Office*